• (12) United States Patent
Lee et al.

(10) Patent No.: US 9,624,583 B2
(45) Date of Patent: Apr. 18, 2017

(54) SLURRY-BASED COATING TECHNIQUES FOR SMOOTHING SURFACE IMPERFECTIONS

(75) Inventors: Kang N. Lee, Zionsville, IN (US); David J. Thomas, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 967 days.

(21) Appl. No.: 12/750,971

(22) Filed: Mar. 31, 2010

(65) Prior Publication Data

US 2010/0255260 A1  Oct. 7, 2010

Related U.S. Application Data

(60) Provisional application No. 61/165,752, filed on Apr. 1, 2009.

(51) Int. Cl.
*B05D 3/00* (2006.01)
*C23C 26/00* (2006.01)
(Continued)

(52) U.S. Cl.
CPC ............ *C23C 26/00* (2013.01); *C04B 41/009* (2013.01); *C04B 41/52* (2013.01); *C04B 41/89* (2013.01);
(Continued)

(58) Field of Classification Search
USPC ........................................................ 427/376.1
See application file for complete search history.

(56) References Cited

U.S. PATENT DOCUMENTS 3,859,061 A   1/1975   Speirs et al.
3,962,059 A   6/1976   Kaup et al.
(Continued)

FOREIGN PATENT DOCUMENTS

DE   102007050141 A1   4/2009
EP       1010774 A1    6/2000
(Continued)

OTHER PUBLICATIONS

Final Office Action for U.S. Appl. No. 11/963,249, dated Dec. 12, 2011, 21 pages.
(Continued)

*Primary Examiner* — Nathan Empie
(74) *Attorney, Agent, or Firm* — Shumaker & Sieffert, P.A.

(57) ABSTRACT

An article may include a substrate defining a surface imperfection and a coating deposited over the substrate. The coating does not substantially reproduce the surface imperfection, and the coating comprises mullite and at least one rare earth silicate, rare earth oxide, alumina, boron oxide, alkali metal oxide, alkali earth metal oxide, silicon, barium strontium aluminosilicate, barium aluminosilicate, strontium aluminosilicate, calcium aluminosilicate, magnesium aluminosilicate, or lithium aluminosilicate. In some examples, the coating may be a first coating deposited from a slurry over the substrate, and a second coating may be deposited over the first coating. In other examples, a first coating that substantially reproduces the surface imperfection may be deposited over the substrate, and the coating that does not substantially reproduce the surface imperfection may be deposited over the first coating.

23 Claims, 5 Drawing Sheets

(51) Int. Cl.
*C23C 30/00* (2006.01)
*C23C 28/04* (2006.01)
*C23C 28/00* (2006.01)
*C04B 41/89* (2006.01)
*C04B 41/00* (2006.01)
*C04B 41/52* (2006.01)
*F01D 5/28* (2006.01)

(52) U.S. Cl.
CPC .......... *C23C 28/042* (2013.01); *C23C 28/321* (2013.01); *C23C 28/3215* (2013.01); *C23C 28/345* (2013.01); *C23C 28/3455* (2013.01); *C23C 30/00* (2013.01); *F01D 5/288* (2013.01); *F05D 2250/621* (2013.01); *Y10T 428/24545* (2015.01)

(56) References Cited

U.S. PATENT DOCUMENTS

| | | | |
|---|---|---|---|
| 4,031,274 A | 6/1977 | Bessen | |
| 4,132,816 A | 1/1979 | Benden et al. | |
| 4,148,275 A | 4/1979 | Benden et al. | |
| 4,347,267 A | 8/1982 | Baldi | |
| 4,358,480 A | 11/1982 | Ecord et al. | |
| 4,501,766 A | 2/1985 | Suzuki et al. | |
| 4,965,095 A | 10/1990 | Baldi | |
| 5,041,309 A | 8/1991 | Davis et al. | |
| 5,057,196 A | 10/1991 | Creech et al. | |
| 5,071,678 A | 12/1991 | Grybowski et al. | |
| 5,217,757 A | 6/1993 | Milaniak et al. | |
| 5,334,417 A | 8/1994 | Rafferty et al. | |
| 5,355,668 A * | 10/1994 | Weil et al. | 60/777 |
| 5,366,754 A | 11/1994 | Milaniak et al. | |
| 5,366,765 A | 11/1994 | Milaniak et al. | |
| 5,683,825 A * | 11/1997 | Bruce et al. | 428/698 |
| 5,807,428 A | 9/1998 | Bose et al. | |
| 5,824,366 A | 10/1998 | Bose et al. | |
| 5,958,204 A | 9/1999 | Creech et al. | |
| 5,976,337 A | 11/1999 | Korinko et al. | |
| 5,997,604 A | 12/1999 | Rafferty et al. | |
| 6,045,863 A | 4/2000 | Olson et al. | |
| 6,110,262 A | 8/2000 | Kircher et al. | |
| 6,180,170 B1 | 1/2001 | Grossmann et al. | |
| 6,235,352 B1 | 5/2001 | Leverant et al. | |
| 6,273,678 B1 | 8/2001 | Darolia | |
| 6,294,261 B1 | 9/2001 | Sangeeta et al. | |
| 6,332,926 B1 | 12/2001 | Pfaendtner et al. | |
| 6,406,561 B1 | 6/2002 | Creech et al. | |
| 6,485,848 B1 * | 11/2002 | Wang et al. | 428/697 |
| 6,497,920 B1 | 12/2002 | Pfaendtner et al. | |
| 6,533,875 B1 | 3/2003 | Pfaendtner et al. | |
| 6,586,052 B2 | 7/2003 | Creech et al. | |
| 6,613,445 B2 | 9/2003 | Sangeeta et al. | |
| 6,616,969 B2 | 9/2003 | Pfaendtner et al. | |
| 6,730,179 B2 | 5/2004 | Kircher | |
| 6,827,969 B1 | 12/2004 | Skoog et al. | |
| 6,989,174 B2 | 1/2006 | Heng et al. | |
| 7,056,555 B2 | 6/2006 | Bauer et al. | |
| 7,509,735 B2 | 3/2009 | Philip et al. | |
| 7,588,797 B2 | 9/2009 | Skoog et al. | |
| 7,842,335 B2 | 11/2010 | Skoog et al. | |
| 9,387,512 B2 | 7/2016 | Lee et al. | |
| 2003/0044536 A1 | 3/2003 | Rigney et al. | |
| 2003/0211242 A1 | 11/2003 | Shah | |
| 2004/0229075 A1 | 11/2004 | Gleeson et al. | |
| 2006/0127695 A1 | 6/2006 | Gleeson et al. | |
| 2007/0207330 A1 | 9/2007 | Tulyani et al. | |
| 2009/0004427 A1 * | 1/2009 | Sarrafi-Nour et al. | 428/76 |
| 2009/0162684 A1 | 6/2009 | Creech | |
| 2010/0086680 A1 | 4/2010 | Creech et al. | |
| 2011/0027467 A1 | 2/2011 | Kirby et al. | |
| 2011/0027469 A1 | 2/2011 | Kirby et al. | |
| 2011/0027470 A1 | 2/2011 | Kirby et al. | |
| 2011/0027476 A1 | 2/2011 | Kirby et al. | |
| 2011/0027484 A1 | 2/2011 | Kirby et al. | |
| 2011/0027517 A1 | 2/2011 | Kirby et al. | |
| 2011/0027556 A1 | 2/2011 | Kirby et al. | |
| 2011/0027557 A1 | 2/2011 | Kirby et al. | |
| 2011/0027558 A1 | 2/2011 | Kirby et al. | |
| 2011/0027559 A1 | 2/2011 | Kirby et al. | |
| 2011/0027578 A1 | 2/2011 | Kirby et al. | |

FOREIGN PATENT DOCUMENTS

| | | |
|---|---|---|
| EP | 1088908 A2 | 4/2001 |
| EP | 1251191 A1 | 10/2002 |
| EP | 1609885 A1 | 12/2005 |
| EP | 1462537 A2 | 4/2008 |
| EP | 1978210 A1 | 10/2008 |
| WO | 0105579 A2 | 1/2001 |
| WO | 2009/085188 A1 | 7/2009 |

OTHER PUBLICATIONS

Response to Final Office Action for U.S. Appl. No. 11/963,249, filed Mar. 12, 2012, 10 pages.
Chen, "Slurry development for the deposition of a GdSiO4+Mullite environmental barrier coating on silicon carbide," Journal of Ceramic Processing Research, vol. 8, No. 2, pp. 142-144, 2007.
Extended European Search Report from European application No. 10158950.5, dated Jun. 14, 2010, 13 pp.
Office Action from U.S. Appl. No. 12/244,363, dated May 17, 2012, 9 pp.
Response to Office Action dated May 17, 2012, from U.S. Appl. No. 12/244,363, filed Aug. 17, 2012, 10 pp.
Response to Office Action dated Jan. 14, 2013, from U.S. Appl. No. 12/244,363, filed Mar. 14, 2013, 8 pp.
Office Action from U.S. Appl. No. 12/244,363, dated Jan. 14, 2013, 6 pp.
European Office Action from counterpart European application No. 10 158 950.5-1362, dated Oct. 23, 2013, 3 pp.
Office Action from U.S. Appl. No. 14/213,466, dated Nov. 19, 2015, 8 pp.
Response to Office Action dated Nov. 9, 2015, from U.S. Appl. No. 14/213,466, filed Feb. 19, 2016, 8 pp.
Final Office Action from U.S. Appl. No. 14/213,466, dated Mar. 4, 2016, 8 pp.
Response to Final Office Action dated Mar. 4, 2016, from U.S. Appl. No. 14/213,466, filed Apr. 20, 2016, 8 pp.
Notice of Allowance from U.S. Appl. No. 14/213,466, dated May 4, 2016, 8 pp.

* cited by examiner

SLURRY-BASED COATING TECHNIQUES FOR SMOOTHING SURFACE IMPERFECTIONS

This application claims priority from U.S. Provisional Application Ser. No. 61/165,752, entitled, "SLURRY-BASED COATING TECHNIQUES FOR SMOOTHING SURFACE IMPERFECTIONS," and filed Apr. 1, 2009, the entire content of which is incorporated herein by reference.

TECHNICAL FIELD

The disclosure is directed to coating methods for depositing a coating on component of a high temperature mechanical system.

BACKGROUND

The components of high-temperature mechanical systems, such as, for example, gas-turbine engines, must operate in severe environments. For example, the high-pressure turbine blades and vanes exposed to hot gases in commercial aeronautical engines typically experience metal surface temperatures of about 1000° C., with short-term peaks as high as 1100° C.

Typical components of high-temperature mechanical systems include a Ni or Co-based superalloy substrate. The substrate can be coated with a thermal barrier coating (TBC) to reduce surface temperatures. The thermal barrier coating may include a thermally insulative ceramic topcoat, and may be bonded to the substrate by an underlying metallic bond coat.

Other component of high-temperature mechanical systems may include a ceramic or ceramic matrix composite substrate, which may be coated with an environmental barrier coating (EBC). The EBC protects the ceramic or ceramic matrix composite substrate from degradation due to environmental factors, such as water vapor attack.

SUMMARY

In many cases it is desirable that a surface of the component is substantially flat or smooth along at least one dimension, in order to provide satisfactory aerodynamic performance. In some examples, the substrate of the component may have surface imperfections that reduce the flatness or smoothness of the surface. Traditional coating techniques result in a TBC or EBC of substantially uniform thickness, which traces the contours of the substrate surface, including any surface imperfections that are present. This results in surface imperfections on the surface of the TBC or EBC.

In general, this disclosure is directed to techniques for coating a substrate of a component of a high temperature mechanical system. For example, the component may be a component of a gas turbine engine, such as a turbine disk, blade, turbine vanes, or the like. In some embodiments, the substrate may include an undesired surface imperfection, which may adversely affect performance of the component. For example, the component may include a turbine blade and the surface imperfection may include a protrusion or depression in the surface of the blade. The protrusion or depression may adversely affect the aerodynamic performance of the turbine blade and, as a result, negatively influence the performance of the gas turbine engine. The coating techniques described herein may result in a coating that mitigates the effect of surface imperfections. For example, the coating techniques described herein may produce a coating which defines a coating surface that does not substantially reproduce the substrate surface imperfection.

In one aspect, the disclosure is directed to a method which includes depositing a first coating over a substrate that defines a surface imperfection. According to this aspect of the disclosure, the first coating substantially reproduces the surface imperfection. The method also includes depositing from a slurry a second coating over the first coating. The second coating does not substantially reproduce the surface imperfection, and the second coating includes mullite and at least one of a rare earth silicate, a rare earth oxide, alumina, boron oxide, an alkali metal oxide, an alkali earth metal oxide, silicon, barium strontium aluminosilicate, barium aluminosilicate, strontium aluminosilicate, calcium aluminosilicate, magnesium aluminosilicate, or lithium aluminosilicate. The method further includes reacting the mullite with the at least one of the rare earth silicate, the rare earth oxide, alumina, boron oxide, the alkali metal oxide, the alkali earth metal oxide, barium strontium aluminosilicate, barium aluminosilicate, strontium aluminosilicate, calcium aluminosilicate, magnesium aluminosilicate, or lithium aluminosilicate.

In another aspect, the disclosure is directed to a method that includes depositing from a slurry a first coating over a substrate that defines a surface imperfection. According to this aspect of the disclosure, the first coating does not substantially reproduce the surface imperfection, and the first coating comprises mullite and at least one of a rare earth silicate, a rare earth oxide, alumina, boron oxide, an alkali metal oxide, an alkali earth metal oxide, silicon, barium strontium aluminosilicate, barium aluminosilicate, strontium aluminosilicate, calcium aluminosilicate, magnesium aluminosilicate, or lithium aluminosilicate. The method further includes reacting the mullite with the at least one of the rare earth silicate, the rare earth oxide, alumina, boron oxide, the alkali metal oxide, the alkali earth metal oxide, silicon, barium strontium aluminosilicate, barium aluminosilicate, strontium aluminosilicate, calcium aluminosilicate, magnesium aluminosilicate, or lithium aluminosilicate, and depositing a second coating over the first coating.

In another aspect, the disclosure is directed to an article including a substrate defining a surface imperfection, and a coating deposited over the substrate. According to this aspect of the invention, the coating does not reproduce the surface imperfection, and the coating comprises mullite and at least one of a rare earth silicate, a rare earth oxide, alumina, boron oxide, an alkali metal oxide, an alkali earth metal oxide, silicon, barium strontium aluminosilicate, barium aluminosilicate, strontium aluminosilicate, calcium aluminosilicate, magnesium aluminosilicate, or lithium aluminosilicate.

The details of one or more examples are set forth in the accompanying drawings and the description below. Other features, objects, and advantages will be apparent from the description and drawings, and from the claims.

DETAILED DESCRIPTION

In general, the present disclosure is directed to coating techniques that may mitigate the effect of a surface imperfection in a substrate on a surface of a coating. For example, the coating techniques may result in a coating surface that does not reproduce the substrate surface imperfection. The coating techniques may include depositing a coating including at least two components from a slurry and reacting the components to form the coating. Deposition of the coating from the slurry may facilitate flow of the coating prior to reaction of the components, and may result in a coating surface that does not substantially reproduce the substrate surface imperfection. In some embodiments, the coating may be substantially self-leveling and the coating surface may be substantially flat or smooth over the substrate surface imperfection.

Figure 1:
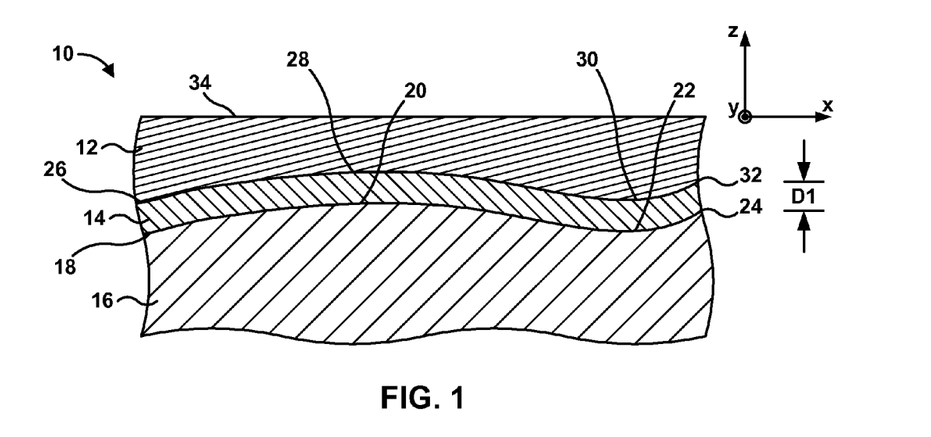
FIG. 1 is a cross-sectional diagram illustrating an exemplary article including a substrate defining a surface imperfection, a first coating deposited over the substrate, which substantially reproduces the surface imperfection, and a second coating deposited over the first coating.

FIG. 1 illustrates a cross-sectional view of an exemplary article 10 used in a high-temperature mechanical system. Article 10 includes a substrate 16, a first coating 14 deposited over substrate 16, and a second coating 12 deposited over first coating 14. In some embodiments, as illustrated in FIG. 1, first coating 14 may be deposited directly on substrate 16. In other embodiments, first coating 14 may be deposited over substrate 16, with one or more intermediate layers (e.g., bond coat 52, FIG. 3). As used herein, "deposited over" is defined as a layer or coating that is deposited on top of another layer or coating, and encompasses both a first layer or coating deposited immediately adjacent a second layer or coating and a first layer or coating deposited on top of a second layer or coating with one or more intermediate layer or coating present between the first and second layers or coatings. In contrast, "deposited directly on" denotes a layer or coating that is deposited immediately adjacent another layer or coating, i.e., there are no intermediate layers or coatings.

Article 10 may be a component of a high temperature mechanical system such as a gas turbine engine or the like. Article 10 may be a turbine disk, a turbine blade, a turbine vane, or the like. In some embodiments, substrate 16 may include a superalloy, such as a superalloy based on Ni, Co, Ni/Fe, and the like. A substrate 16 including a superalloy may include other additive elements to alter its mechanical properties, such as toughness, hardness, temperature stability, corrosion resistance, oxidation resistance, and the like, as is well known in the art. Any useful superalloy may be utilized for substrate 16, including, for example, those available from Martin-Marietta Corp., Bethesda, Md., under the trade designation MAR-M247; those available from Cannon-Muskegon Corp., Muskegon, Mich., under the trade designations CMSX-4 and CMXS-10; and the like.

In other embodiments, substrate 16 may include a ceramic or ceramic matrix composite (CMC). A substrate 16 including a ceramic or CMC may include any useful ceramic material, including, for example, silicon carbide, silicon nitride, alumina, silica, and the like. The CMC may further include any desired filler material, and the filler material may include a continuous reinforcement or a discontinuous reinforcement. For example, the filler material may include discontinuous whiskers, platelets, or particulates. As another example, the filler material may include a continuous monofilament or multifilament weave.

The filler composition, shape, size, and the like may be selected to provide the desired properties to the CMC. For example, the filler material may be chosen to increase the toughness of a brittle ceramic matrix. The filler may also be chosen to provide thermal conductivity, electrical conductivity, thermal expansion, hardness, or the like to the CMC.

In some embodiments, the filler composition may be the same as the ceramic matrix material. For example, a silicon carbide matrix may surround silicon carbide whiskers. In other embodiments, the filler material may include a different composition than the ceramic matrix, such as aluminum silicate fibers in an alumina matrix, or the like. One preferred CMC includes silicon carbide continuous fibers embedded in a silicon carbide matrix.

Some example ceramics and CMCs which may be used for substrate 16 include ceramics containing Si, such as SiC and $Si_3N_4$; composites of SiC or $Si_3N_4$ and silicon oxynitride or silicon aluminum oxynitride; metal alloys that include Si, such as a molybdenum-silicon alloy (e.g., $MoSi_2$) or niobium-silicon alloys (e.g., $NbSi_2$); and oxide-oxide ceramics.

In the embodiment illustrated in FIG. 1, substrate 16 defines a surface imperfection. The surface imperfection may be characterized as a protrusion 20, defined with respect to first point 18 and depression 22, or may be characterized as a depression 22, defined with respect to protrusion 20 and second point 24. Stated another way, the surface imperfection may be defined with reference to two or more points on a surface of substrate 16, and the characterization of the surface imperfection as a protrusion 20 or depression 22 may depend on the choice of reference points on the surface of substrate 16.

In any case, the term surface imperfection may refer to any deviation from the intended geometry of the surface of substrate 16. For example, the surface of substrate 16 may be intended to be substantially planar but due to the process used to manufacture substrate 16, may include a protrusion 20, depression 22, or another imperfection. For example, the surface imperfection may be an undulation in the surface, a groove, a ridge, or the like. The protrusion 20, depression 22, or other non-planarity may be substantially isolated (e.g., a single, isolated surface imperfection), or may be one of a set of surface imperfections. If the surface imperfection is one of a set of surface imperfections, the set of surface imperfections may define a periodic or an aperiodic (e.g., random) array of surface imperfections. For example, a set of surface imperfections may form a series of grooves, ridges, undulations, or the like.

In the embodiment illustrated in FIG. 1, article 10 includes a first coating 14 deposited on substrate 16. As described above, in other embodiments first coating 14 may be deposited over substrate 16 with one or more intermediate layer present between substrate 16 and first coating 14 (see, for example, FIG. 3). First coating 14 may include, for example, an environmental barrier coating (EBC) or a thermal barrier coating (TBC).

In embodiments in which first coating 14 comprises a TBC, the TBC may provide thermal protection to substrate 16. The TBC may be selected from a variety of materials, including, for example, yttria-stabilized zirconia, yttria-stabilized hafnia, rare earth oxides, alumina, silica, rare earth silicates, titania, alkali metal oxides, alkali earth metal oxides, a rare earth oxide-stabilized zirconia, a rare earth oxide-stabilized hafnia, or combinations thereof.

Yttria-stabilized zirconia includes zirconia ($ZrO_2$) mixed with a minority amount of yttrium oxide ($Y_2O_3$). For example, one yttria-stabilized zirconia composition includes zirconia stabilized by about 7 wt. % to about 8 wt. % yttrium oxide, and may be referred to as 7-8 YSZ.

Rare earth oxides used in the TBC include, for example, oxides of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), scandium (Sc), and combinations thereof. The same rare earth elements may also be useful when present as rare earth silicates, which include both rare earth monosilicates ($RE_2SiO_5$, where RE is a rare earth element) and rare earth disilicates ($RE_2Si_2O_7$, where RE is a rare earth element).

In some embodiments, the TBC may also include rare earth oxide-stabilized zirconia or rare earth oxide-stabilized hafnia. The zirconia or hafnia may be stabilized by one or more of the rare earth oxides listed above, and in some embodiments, may be stabilized by at least three rare earth oxides. For example, the zirconia or hafnia may be stabilized by a primary dopant, a first co-dopant and a second co-dopant.

In embodiments in which first coating 14 comprises an EBC, the EBC may provide at least one of water vapor stability, chemical stability, or environmental durability to a substrate 16 that includes, for example, a ceramic or CMC. The EBC may include, for example, a rare earth silicate, barium strontium alumina silicate (BaO—SrO—$Al_2O_3$-$2SiO_2$; BSAS), barium alumina silicate (BaO—$Al_2O_3$-$2SiO_2$; BAS), strontium alumina silicate (SrO—$Al_2O_3$-$2SiO_2$; SAS), calcium alumina silicate (CaO—$Al_2O_3$-$2SiO_2$; CAS), magnesium alumina silicate (MgO—$Al_2O_3$-$2SiO_2$; MAS) and lithium alumina silicate ($Li_2O$—$Al_2O_3$-$2SiO_2$; LAS); and the like.

As shown in FIG. 1, first coating 14 may substantially reproduce the shape and contour of the surface of substrate 16, including the surface imperfection, e.g., protrusion 20 and depression 22. In particular, first point 18 of substrate 16 and coating first point 26, protrusion 20 of substrate 16 and coating protrusion 28, depression 22 of substrate 16 and coating depression 30, and second point 24 of substrate 16 and coating second point 32 are each approximately a distance D1 from each other. Stated another way, a surface of first coating 14 opposite the surface of substrate 16 substantially parallels the surface of substrate 16. First coating 14 may comprise a thickness between approximately 0.001 inch (approximately 1 mil or 25.4 micrometers (μm)) and approximately 0.02 inch (approximately 20 mils or 508 μm). In some embodiments, first coating 14 may comprise a thickness between approximately 0.003 inch (approximately 3 mils or 76.2 μm) and 0.01 inch (approximately 10 mils or 254 μm).

Second coating 12 is deposited directly on first coating 14 in the embodiment illustrated in FIG. 1. In other embodiments, second coating 12 may be deposited over first coating 14 with one or more layers between first coating 14 and second coating 12. Second coating 12 defines a surface 34 opposite first coating 14. Surface 34 does not substantially reproduce the surface imperfections of substrate 16, i.e., does not substantially reproduce protrusion 20 and depression 22. In the embodiment illustrated in FIG. 1, surface 34 is substantially flat or smooth along at least one dimension (the x-axis dimension) over protrusion 20 and depression 22. In some embodiments, surface 34 may be substantially flat or smooth along two dimensions (e.g., the x-axis dimension and the y-axis dimension) over protrusion 20 and/or depression 22.

Figure 2:
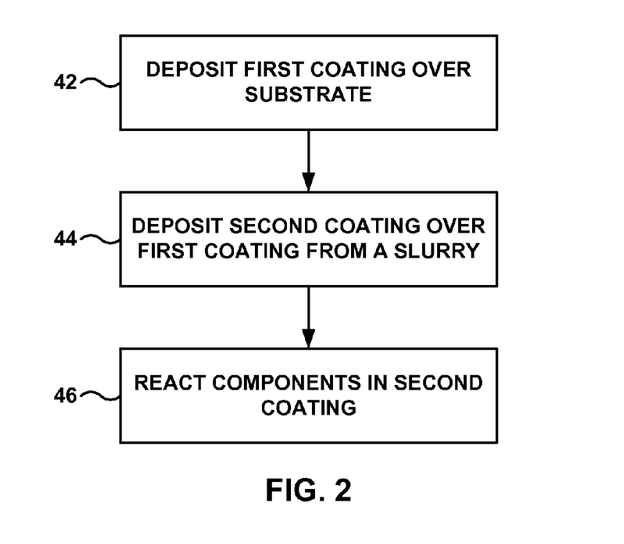
FIG. 2 is a flow diagram illustrating an exemplary technique for coating a substrate that defines a surface imperfection.

Second coating 12 may be deposited over first coating 14 from a slurry, as described in further detail with respect to FIG. 2. By depositing second coating 12 from a slurry, second coating 12 may be allowed to flow, e.g., under the influence of gravity, to form a substantially smooth surface 34, which may not substantially reproduce protrusion 20 or depression 22 of substrate 16. A number of factors, including, for example, the viscosity of the slurry, may control the extent to which the slurry is allowed to flow. The viscosity of the slurry may be affected by, for example, the solvent in which the slurry is formed, the amount of loading of the coating material in the solvent, or any additives present in the slurry. Another factor that may influence the extent to which the slurry is allowed to flow may be, for example, the time allowed for flow before the coating is dried to remove substantially all of the solvent.

Second coating 12 may include a range of thicknesses. For example, the thickness of second coating 12 measured from a surface of coating protrusion 28 to substantially smooth surface 34 may be different than the thickness of second coating 12 measured a surface of coating depression 30 to substantially smooth surface 34. In some embodiments, the thickness of second coating 12 may range from approximately 0.001 inch (approximately 1 mil or 25.4 μm) to approximately 0.02 inch (approximately 20 mils or 508 μm). Of course, in some examples, the thickness of a portion substantially all of second coating 12 may fall outside of this range. In some embodiments, the thickness of at least a portion of second coating 12 may range from approximately 0.002 inch (approximately 2 mils or 50.8 μm) to approximately 0.005 inch (approximately 5 mils or 127 μm).

Second coating 12 may comprise mullite ($3Al_2O_3 2SiO_2$ or $2Al_2O_3SiO_2$) and at least one of a rare earth silicate, a rare earth oxide, alumina, boron oxide, alkali metal oxide, alkali earth metal oxide, silicon, BSAS, BAS, SAS, CAS, MAS, or LAS. As described above, the rare earth oxide may include an oxide of at least one of Lu, Yb, Tm, Er, Ho, Dy, Gd, Tb, Eu, Sm, Pm, Nd, Pr, Ce, La, Y, or Sc. Similarly, the rare earth silicate may include a monosilicate or disilicate of at least one of Lu, Yb, Tm, Er, Ho, Dy, Gd, Tb, Eu, Sm, Pm, Nd, Pr, Ce, La, Y, or Sc. The mullite and the at least one of a rare earth silicate, a rare earth oxide, alumina, boron oxide, an alkali metal oxide, an alkali earth metal oxide, silicon, BSAS, BAS, SAS, CAS, MAS, or LAS may react after being deposited as second coating 12 to form coating 12. The reaction may form a glass phase such as a rare earth alumino silicate glass phase, an alkali alumino silicate glass phase, an alkali earth alumino silicate glass phase, a borosilicate glass phase, or the like, depending on the particular composition of the second component of second coating 12.

FIG. 2 illustrates an exemplary technique for forming article 10. Initially first coating 14 is deposited over substrate 16 (42). First coating 14 may be deposited by, for example, plasma spraying, physical vapor deposition, cathodic arc deposition, or chemical vapor deposition. As described above with respect to FIG. 1, any of these deposition techniques may result in first coating 14 substantially reproducing the surface geometry of substrate 16, including protrusion 20 and depression 22.

Once first coating 14 has been deposited, second coating 12 is deposited from a slurry over first coating 14 (44). The slurry from which second coating 12 is deposited may include a solvent, mullite, and at least one of a rare earth silicate, a rare earth oxide, alumina, boron oxide, an alkali metal oxide, an alkali earth metal oxide, silicon, BSAS, BAS, SAS, CAS, MAS, or LAS. In some embodiments, the slurry may further include a binder, a dispersant, or both.

The mullite and the at least one of a rare earth silicate, a rare earth oxide, alumina, boron oxide, an alkali metal oxide, an alkali earth metal oxide, silicon, BSAS, BAS, SAS, CAS, MAS, or LAS may be present in the slurry in a range of relative amounts. In some embodiments, a dry powder of the mullite and the at least one rare earth oxide or rare earth silicate (e.g., not including any binder, dispersant, or solvent) may include between approximately 1 weight percent (wt. %) mullite and approximately 99 wt. % mullite, and a balance of at least one rare earth oxide or rare earth silicate. In a particular embodiment, a dry powder of the mullite and the at least one of a rare earth silicate, a rare earth oxide, alumina, boron oxide, an alkali metal oxide, an alkali earth metal oxide, silicon, BSAS, BAS, SAS, CAS, MAS, or LAS may include approximately 12 wt. % rare earth silicate and the balance mullite.

The viscosity of the slurry may influence the formation of second coating 12. For example, a lower viscosity may result in a thinner second coating 12, because the slurry will be more able to flow due to the effects of gravity or other forces. Conversely, a higher viscosity may result in a thicker second coating 12, because the slurry will not flow as easily. The viscosity of the slurry may be influenced by the particle size of the mullite and the at least one rare earth silicate, rare earth oxide, alumina, boron oxide, alkali metal oxide, alkali earth metal oxide, silicon, BSAS, BAS, SAS, CAS, MAS, or LAS in the slurry, the solvent viscosity, the percent solids (i.e., mullite, rare earth silicate, rare earth oxide, alumina, boron oxide, alkali metal oxide, alkali earth metal oxide, silicon, BSAS, BAS, SAS, CAS, MAS, or LAS) in the slurry, and the concentration of binder in the slurry.

The slurry may include particles of mullite and at least one rare earth silicate, rare earth oxide, alumina, boron oxide, alkali metal oxide, alkali earth metal oxide, silicon, BSAS, BAS, SAS, CAS, MAS, or LAS each having a narrowly distributed range of diameters or a more broadly distributed range of diameters. The diameters of the mullite and the at least one rare earth silicate, rare earth oxide, alumina, boron oxide, alkali metal oxide, alkali earth metal oxide, silicon, BSAS, BAS, SAS, CAS, MAS, or LAS may have a similar mean, median, distribution, or other characteristic measurement. Generally, the average diameter of the mullite and the at least one rare earth silicate, rare earth oxide, alumina, boron oxide, alkali metal oxide, alkali earth metal oxide, silicon, BSAS, BAS, SAS, CAS, MAS, or LAS particles may be on the order of tenths of a micrometer (approximately 0.000004 inch or 0.004 mils) to tens of micrometers (approximately 0.004 inch or 4 mils). The average diameters of the mullite particles and at least one rare earth silicate, rare earth oxide, alumina, boron oxide, alkali metal oxide, alkali earth metal oxide, silicon, BSAS, BAS, SAS, CAS, MAS, or LAS particles, respectively, may be similar or may be different. In some embodiments, the mullite particles may have an average diameter between approximately 0.1 μm (approximately 0.000004 inch or 0.004 mils) and approximately 10 μm (approximately 0.0004 inch or 0.4 mils). In other embodiments, the mullite particles may have an average diameter between approximately 1 μm and approximately 3 μm (approximately 0.00012 inch or 0.12 mils). The at least one of a rare earth silicate, rare earth oxide, alumina, boron oxide, alkali metal oxide, alkali earth metal oxide, silicon, BSAS, BAS, SAS, CAS, MAS, or LAS particles may have an average diameter of between approximately 0.1 μm (approximately 0.000004 inch or 0.004 mils) and approximately 10 μm (approximately 0.0004 inch or 0.4 mils). In some embodiments, the at least one of a rare earth silicate, rare earth oxide, alumina, boron oxide, alkali metal oxide, alkali earth metal oxide, silicon, BSAS, BAS, SAS, CAS, MAS, or LAS particles may have an average diameter of between approximately 0.6 μm (approximately 0.000024 inch or 0.024 mils) and approximately 1.5 μm (approximately 0.000059 inch or 0.059 mils). When all other factors are equal, a slurry including larger particles may have a higher viscosity than a slurry including smaller particles.

The slurry may include a range of percent solids in the solvent. For example, the slurry may include up to approximately 10 g solids per 1 g solvent. In some embodiments, the slurry may include between approximately 0.1 g solids per 1 g solvent and approximately 5 g solids per 1 g solvent. In particular embodiments, the slurry may include approximately 1 g solids per 1 g solvent, or may include approximately 1 g solids per 4 g solvent (0.25 g solids per 1 g solvent).

The solvent may include, for example, ethanol, isopropyl alcohol, water or the like.

A dispersant may be included in the slurry to mitigate or substantially prevent agglomeration of the particles of mullite and at least one rare earth silicate, rare earth oxide, alumina, boron oxide, alkali metal oxide, alkali earth metal oxide, silicon, BSAS, BAS, SAS, CAS, MAS, or LAS in the slurry. In some embodiments, the dispersant may include polyvinyl butyral or phosphate ester.

The slurry may also include a binder. The binder may facilitate formation of a desirable second coating 12 by mitigating or substantially preventing cracks from forming in second coating 12 during drying. In some embodiments, the binder may include polyvinyl butyral.

The slurry may be deposited on first coating 14 by, for example, dip coating, spraying, painting, or the like. In some embodiments, substrate 16 and first coating 14 may be submerged in the slurry and then removed relatively slowly from the slurry. For example, the substrate 16 and first coating 14 may be withdrawn from the slurry at a rate of approximately 0.1 millimeters/second (mm/s) to approximately 10 mm/s. In other examples, the substrate 16 and first coating 14 may be withdrawn from the slurry at a rate of between approximately 3 mm/s and approximately 5 mm/s. The rate at which substrate 16 is withdrawn from the slurry may affect the thickness of second coating 12. For example, a slower withdrawal rate may result in a thicker coating, while a faster withdrawal rate may result in a thinner coating. In some embodiments, second coating 12 may be more likely to crack during post-dip sintering when coating 12 is thicker.

Finally, article 10 is dried to facilitate formation of second coating 12 and reaction of the mullite and the at least one rare earth silicate, rare earth oxide, alumina, boron oxide, alkali metal oxide, alkali earth metal oxide, silicon, BSAS, BAS, SAS, CAS, MAS, or LAS (46). For example, article 10 may be dried under a vacuum or in air at temperatures up to about 300° C. to remove substantially all of the solvent of the slurry and leave the mullite and the at least one rare earth silicate, rare earth oxide, alumina, boron oxide, alkali metal oxide, alkali earth metal oxide, silicon, BSAS, BAS, SAS, CAS, MAS, or LAS in second coating 12. After drying the mullite and the at least one rare earth silicate, rare earth oxide, alumina, boron oxide, alkali metal oxide, alkali earth metal oxide, silicon, BSAS, BAS, SAS, CAS, MAS, or LAS, article 10 may be heat-treated at temperatures of up to approximately 1500° C. in a vacuum, an inert atmosphere such as Ar or He, a reducing atmosphere such as $H_2$, or air to facilitate sintering and chemical reaction in second coating 12. In some embodiments, the heat treatment may last as long as approximately 10 hours, i.e., up to approximately 10 hours. In some embodiments, the heat treatment may last as long as approximately 1 hr, i.e., up to approximately 1 hour. In some examples, the heat treatment may be performed in multiple steps with similar or different temperatures at each step.

Figure 3:
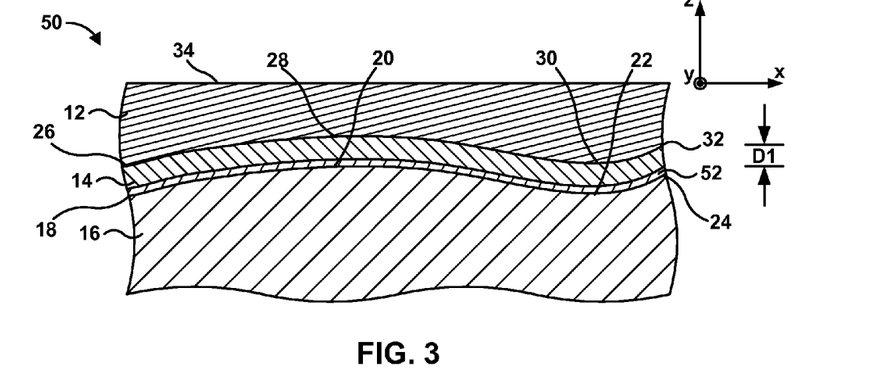
FIG. 3 is a cross-sectional diagram illustrating an exemplary article including a substrate defining a surface imperfection, a bond coat and a first coating deposited over the substrate, which both reproduce the surface imperfection, and a second coating deposited over the first coating.

FIG. 3 is a cross-sectional diagram of another exemplary article 50 that includes a second coating 12 deposited over a substrate 16 that includes surface imperfections. In contrast to article 10 shown in FIG. 1, article 50 includes a bond coat 52 deposited directly on substrate 16. In FIG. 3, first coating 14 is deposited directly on bond coat 52 and second coating 12 is deposited directly on first coating 14. In other embodiments, an article 50 may include additional layers between bond coat 52 and first coating 14, between first coating 14 and second coating 12, or both.

Bond coat 52 may be deposited over or deposited directly on substrate 16, and may substantially reproduce the contour of the surface of substrate 16, including any surface imperfections, e.g., protrusion 20 or depression 22. Bond coat 52 may improve adhesion between first coating 14 and substrate 16. In embodiments in which substrate 16 includes a superalloy, bond coat 52 may include an alloy, such as a MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-Ni₃Al nickel aluminide alloy (either unmodified or modified by Pt, Cr, Hf, Zr, Y, Si, and combinations thereof), or the like.

In other embodiments, bond coat 52 may include a ceramic or other material that is compatible with a substrate 16 that includes a ceramic or CMC. For example, bond coat 52 may include mullite (aluminum silicate, $Al_6Si_2O_{13}$), silica, silicides, silicon, or the like. Bond coat 52 may also include other ceramics, such as rare earth silicates, including silicates of Lu, Yb, Tm, Er, Ho, Dy, Gd, Tb, Eu, Sm, Pm, Nd, Pr, Ce, La, Y, Sc, or the like. Some preferred compositions of a bond coat 52 on a substrate 16 including a CMC or ceramic include silicon, mullite, and ytterbium silicate.

Bond coat 52 may be selected based on a number of considerations, including the chemical composition and phase constitution of first coating 14 and substrate 16. For example, when substrate 16 includes a superalloy with a γ-Ni+γ'-Ni₃Al phase constitution, bond coat 52 may include a γ-Ni+γ'-Ni₃Al phase constitution to better match the coefficient of thermal expansion of substrate 16, and therefore increase the mechanical stability (adhesion) of bond coat 52 to substrate 16. Alternatively, when substrate 16 includes a CMC, bond coat 52 may include silicon and/or a ceramic, such as, for example, mullite or a rare earth silicate.

In some embodiments, bond coat 52 may include multiple layers. A bond coat 52 that includes multiple layers may be desirable because each layer may perform a separate function. For example, in some embodiments in which substrate 16 is a CMC including silicon carbide, a bond coat 52 including a first layer of silicon may be deposited on substrate 16, followed by the deposition of a second layer including mullite or a rare earth silicate. The silicon layer may provide bonding while the ceramic layer provides a gradual transition of thermal expansion and prevents water vapor from reaching the silicon layer.

In other embodiments, as described with respect to FIG. 1, an article may not include a bond coat 52. Bond coat 52 may not be required or desired when first coating 14 and substrate 16 are chemically and/or mechanically compatible. For example, in embodiments in which first coating 14 and substrate 16 adhere sufficiently strongly to each other, a bond coat 52 may not be necessary.

As described above with respect to FIG. 1, first coating 14 may include, for example, an environmental barrier coating (EBC) or a thermal barrier coating (TBC). In embodiments in which first coating 14 comprises a TBC, the TBC may be selected from a variety of materials, including, for example, yttria-stabilized zirconia, yttria-stabilized hafnia, rare earth oxides, alumina, silica, rare earth silicates, titania, alkali metal oxides, alkali earth metal oxides, a rare earth oxide-stabilized zirconia, a rare earth oxide-stabilized hafnia, or combinations thereof.

In embodiments in which first coating 14 comprises an EBC, the EBC may provide at least one of water vapor stability, chemical stability, and environmental durability to a substrate 16 that includes, for example, a ceramic or CMC. The EBC may include, for example, a rare earth silicate, BSAS, BAS, SAS, CAS, MAS, LAS, or the like.

First coating 14 may substantially reproduce the shape and contour of the surface of substrate 16, including the surface imperfection, e.g., protrusion 20 and depression 22. In particular, first point 18 of substrate 16 and coating first point 26, protrusion 20 of substrate 16 and coating protrusion 28, depression 22 of substrate 16 and coating depression 30, and second point 24 of substrate 16 and coating second point 32 are each approximately a distance D1 from each other. Stated another way, a surface of first coating 14 opposite the surface of substrate 16 substantially parallels the surface of substrate 16.

Second coating 12 is deposited directly on first coating 14 in the embodiment illustrated in FIG. 3. In other embodiments, second coating 12 may be deposited over first coating 14 with one or more layers between first coating 14 and second coating 12. Second coating 12 defines a surface 34 opposite first coating 14. Surface 34 does not substantially reproduce the surface imperfections of substrate 16, i.e., does not substantially reproduce protrusion 20 and depression 22. In the embodiment illustrated in FIG. 3, surface 34 is substantially flat or smooth along at least one dimension (the x-axis dimension) over protrusion 20 and depression 22.

In some embodiments, surface 34 may be substantially flat or smooth along two dimensions (e.g., the x-axis dimension and the y-axis dimension) over protrusion 20 and/or depression 22.

Second coating 12 may be deposited over first coating 14 from a slurry, as described in further detail with respect to FIG. 2. By depositing second coating 12 from a slurry, second coating 12 may be allowed to flow, e.g., under the influence of gravity, to form a substantially smooth surface 34, which may not substantially reproduce protrusion 20 or depression 22 of substrate 16.

Second coating 12 may comprise mullite ($3Al_2O_3 2SiO_2$ or $2Al_2O_3 SiO_2$) and at least one rare earth silicate, rare earth oxide, alumina, boron oxide, alkali metal oxide, alkali earth metal oxide, silicon, BSAS, BAS, SAS, CAS, MAS, or LAS. As described above, the rare earth oxide may include an oxide of at least one of Lu, Yb, Tm, Er, Ho, Dy, Gd, Tb, Eu, Sm, Pm, Nd, Pr, Ce, La, Y, or Sc. Similarly, the rare earth silicate may include a silicate of at least one of Lu, Yb, Tm, Er, Ho, Dy, Gd, Tb, Eu, Sm, Pm, Nd, Pr, Ce, La, Y, or Sc. The mullite and the at least one rare earth silicate, rare earth oxide, alumina, boron oxide, alkali metal oxide, alkali earth metal oxide, silicon, BSAS, BAS, SAS, CAS, MAS, or LAS may react after being deposited as second coating 12 to form a coating 12 comprising a glass phase such as a rare earth aluminosilicate glass phase, an alkali aluminosilicate glass phase, an alkali earth aluminosilicate glass phase, a borosilicate glass phase, or the like.

Figure 4:
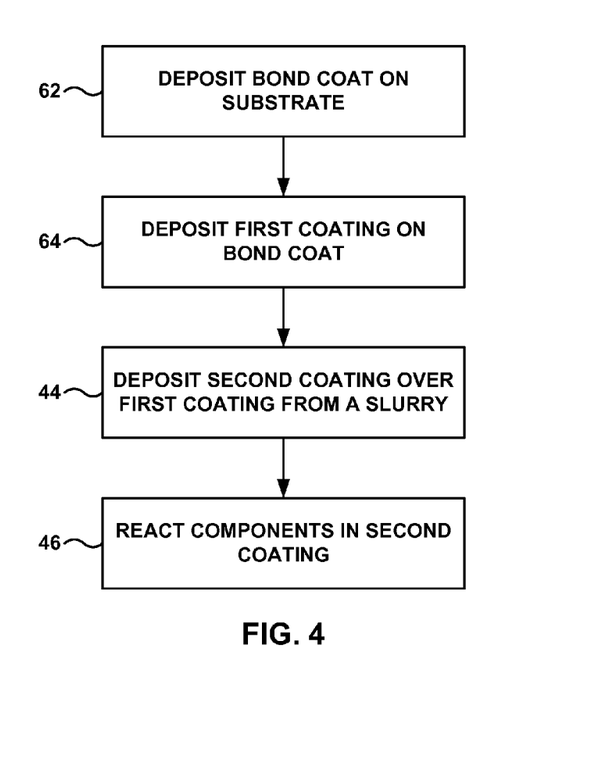
FIG. 4 is a flow diagram illustrating another exemplary technique for coating a substrate that defines a surface imperfection.

FIG. 4 illustrates an exemplary technique of forming an article 50 including a bond coat 52. First, bond coat 52 is deposited on substrate 16 (62). Bond coat 52 may be deposited on substrate 16 via one of a number of methods, including, for example, chemical vapor deposition (CVD), physical vapor deposition (PVD), plasma spraying, cathodic arc deposition, sputtering, pack cementation, or the like. As illustrated in FIG. 3, bond coat 52 may substantially reproduce the contour of the surface of substrate 16, including any surface imperfections such as protrusion 20 or depression 22.

First coating 14 may then be deposited on bond coat 52 (64). First coating 14 may be deposited by, for example, plasma spraying, physical vapor deposition, cathodic arc deposition, or chemical vapor deposition. As described above with respect to FIG. 1, any of these deposition techniques may result in first coating 14 that substantially reproduces the contour of substrate 16 and bond coat 52, including, for example, protrusion 20 and depression 22.

Once first coating 14 has been deposited, second coating 12 is deposited from a slurry over first coating 14 (44). The slurry from which second coating 12 is deposited may include a solvent, mullite, and at least one rare earth silicate, rare earth oxide, alumina, boron oxide, alkali metal oxide, alkali earth metal oxide, silicon, BSAS, BAS, SAS, CAS, MAS, or LAS. In some embodiments, the slurry may further include a binder, a dispersant, or both.

The slurry may be deposited on first coating 14 by, for example, dip coating, spraying, painting, or the like. In some embodiments, substrate 16 and first coating 14 may be submerged in the slurry and then removed relatively slowly from the slurry. For example, the substrate 16 and first coating 14 may be withdrawn from the slurry at a rate of approximately 1 millimeters/second (mm/s) to approximately 10 mm/s. In other embodiments, substrate 16 may be withdrawn from the slurry at a rate of approximately 3 mm/s to approximately 5 mm/s Finally, article 50 is dried to facilitate formation of second coating 12 and reaction of the mullite and the at least one rare earth silicate, rare earth oxide, alumina, boron oxide, alkali metal oxide, alkali earth metal oxide, silicon, BSAS, BAS, SAS, CAS, MAS, or LAS (46). For example, article 50 may be dried under a vacuum or in air at temperatures up to approximately 300° C. to remove substantially all of the solvent of the slurry and leave the mullite and the at least one rare earth silicate, rare earth oxide, alumina, boron oxide, alkali metal oxide, alkali earth metal oxide, silicon, BSAS, BAS, SAS, CAS, MAS, or LAS in second coating 12. After drying second coating 12, article 50 may be heat-treated at temperatures up to approximately 1500° C. in a vacuum, an inert atmosphere such as Ar or He, a reducing atmosphere such as $H_2$, or air to facilitate sintering and chemical reaction of the mullite and the at least one rare earth silicate, rare earth oxide, alumina, boron oxide, alkali metal oxide, alkali earth metal oxide, silicon, BSAS, BAS, SAS, CAS, MAS, or LAS. When heated, the mullite and the at least one rare earth silicate, rare earth oxide, alumina, boron oxide, alkali metal oxide, alkali earth metal oxide, silicon, BSAS, BAS, SAS, CAS, MAS, or LAS may react to form a glass phase such as, for example, a rare earth alumino silicate glass phase, an alkali alumino silicate glass phase, an alkali earth alumino silicate glass phase, a borosilicate glass phase, or the like. In some embodiments, the heat treatment may last as long as approximately 10 hours, i.e., up to approximately 10 hours. In some embodiments, the heat treatment may last as long as approximately 1 hr, i.e., up to approximately 1 hour. in some examples, the heat treatment may be performed in multiple steps with similar or different temperatures at each step.

Figure 5:
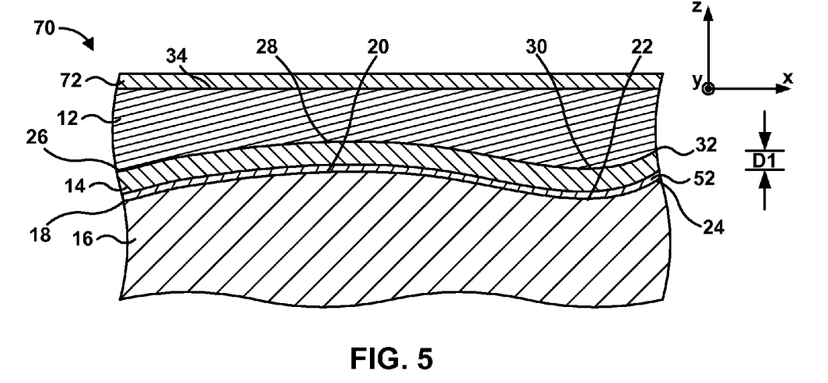
FIG. 5 is a cross-sectional diagram illustrating an exemplary article including a substrate defining a surface imperfection, a bond coat and a first coating deposited over the substrate, which both reproduce the surface imperfection, a second coating deposited over the first coating, and a third coating deposited over the second coating.

In some embodiments, as illustrated in FIG. 5, an article 70 may include a third coating 72 deposited over second coating 12. Third coating 72 may be deposited over second coating 12 to add additional thickness to the coating over substrate 16, or to provide additional properties. In some embodiments, third coating 72 may include an EBC or a TBC. In embodiments in which third coating 72 comprises a TBC, the TBC may be selected from a variety of materials, including, for example, yttria-stabilized zirconia, yttria-stabilized hafnia, rare earth oxides, alumina, silica, rare earth silicates, titania, alkali metal oxides, alkali earth metal oxides, a rare earth oxide-stabilized zirconia, a rare earth oxide-stabilized hafnia, or combinations thereof.

In embodiments in which third coating 72 comprises an EBC, the EBC may provide at least one of water vapor stability, chemical stability, and environmental durability to a substrate 16 that includes, for example, a ceramic or CMC. The EBC may include, for example, a rare earth silicate, BSAS, BAS, SAS, CAS, MAS, LAS, or the like.

Figure 6:
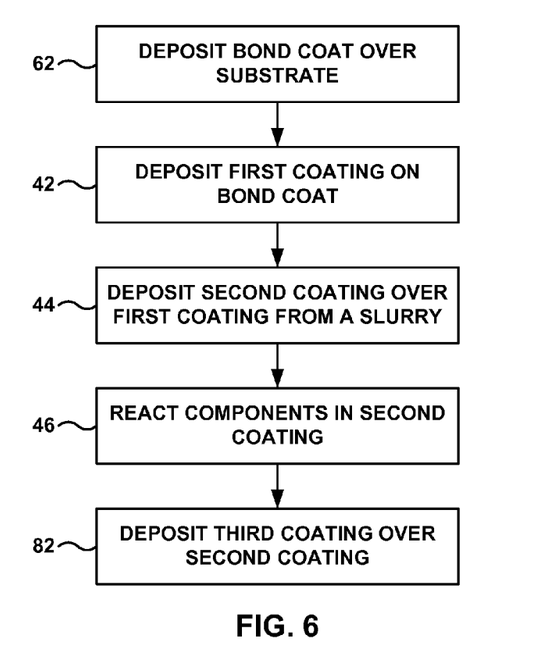
FIG. 6 is a flow diagram illustrating another exemplary technique for coating a substrate that defines a surface imperfection.

As illustrated in FIG. 6, third coating 72 may be deposited over second coating 12 (82) after the components of the second coating 12 have reacted (46). Third coating 72 may be deposited by, for example, plasma spraying, chemical vapor deposition, physical vapor deposition, cathodic arc deposition, or the like. Third coating 72 may be deposited to a thickness of between approximately 0.001 inch (approximately 1 mil or 25.4 micrometers (μm)) and approximately 0.02 inch (approximately 20 mils or 508 μm).

Figure 7:
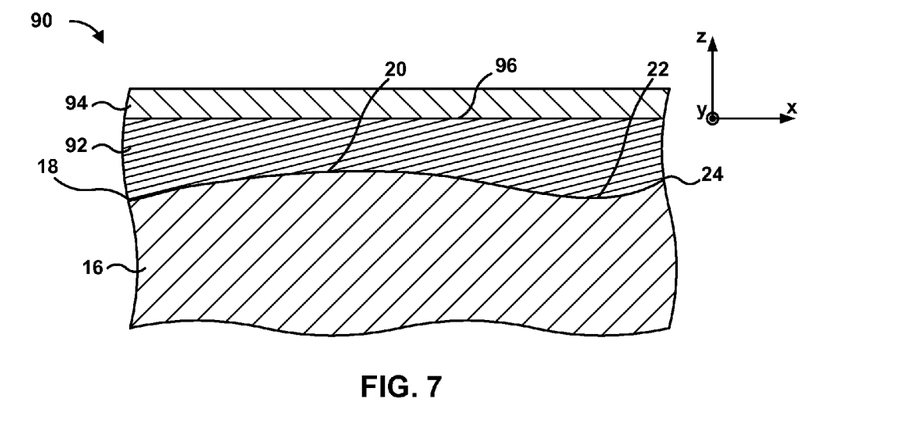
FIG. 7 is a cross-sectional diagram illustrating an exemplary article including a substrate defining a surface imperfection, a first coating deposited over the substrate, which does not reproduce the surface imperfection, and a second coating deposited over the first coating.

Although FIGS. 1-6 have described techniques for forming an article including a coating deposited from a slurry over a first coating, in other embodiments, as illustrated in FIGS. 7-10, a coating may be deposited from a slurry over substrate 16 or bond coat 52. As FIG. 7 shows a first layer 92 may be deposited directly on substrate 16, which includes a surface defining surface imperfections. In particular, the surface of substrate 16 defines a protrusion 20 and a depression 22. Protrusion 20 may be defined with reference to first point 18 and depression 22, while depression 22 may be defined with reference to protrusion 20 and second point 24. As described above, whether a surface imperfection is described as a protrusion 20 or a depression 22 may depend on the choice of reference points on the surface of substrate 16.

First coating 92 defines a surface 96 opposite the surface defined by substrate 16. Because first coating 92 is deposited from a slurry, surface 96 does not substantially reproduce the surface imperfections of substrate 16, i.e., does not substantially reproduce protrusion 20 and depression 22. First coating 92 may flow, e.g., under the influence of gravity, to form a substantially smooth surface 96, which may not substantially reproduce protrusion 20 or depression 22 of substrate 16. The extent to which the slurry flows may be influenced by a number of factors, including, for example, the solvent in which the slurry is formed, the amount of loading of the coating material in the solvent, any additives in the slurry, the time allowed for flow before the coating is dried to remove substantially all of the solvent, or the like.

In the embodiment illustrated in FIG. 7, surface 96 is substantially flat or smooth along at least one dimension (the x-axis dimension) over protrusion 20 and depression 22. In some embodiments, surface 96 may be substantially flat or smooth along two dimensions (e.g., the x-axis dimension and the y-axis dimension) over protrusion 20 and/or depression 22. In other embodiments, surface 96 may not be substantially smooth or flat along at least one dimension, but may define a surface that does not substantially reproduce the surface of substrate 16, e.g., has a different contour or curvature than the surface of substrate 16.

First coating 92 may comprise mullite ($3Al_2O_3 2SiO_2$ or $2Al_2O_3 SiO_2$) and at least one rare earth silicate, rare earth oxide, alumina, boron oxide, alkali metal oxide, alkali earth metal oxide, silicon, BSAS, BAS, SAS, CAS, MAS, or LAS. As described above, the rare earth oxide may include an oxide of at least one of Lu, Yb, Tm, Er, Ho, Dy, Gd, Tb, Eu, Sm, Pm, Nd, Pr, Ce, La, Y, or Sc. Similarly, the rare earth silicate may include a silicate of at least one of Lu, Yb, Tm, Er, Ho, Dy, Gd, Tb, Eu, Sm, Pm, Nd, Pr, Ce, La, Y, or Sc. The mullite and the at least one rare earth silicate, rare earth oxide, alumina, boron oxide, alkali metal oxide, alkali earth metal oxide, silicon, BSAS, BAS, SAS, CAS, MAS, or LAS may react after being deposited as first coating 92 to form a coating 92 comprising a glass phase such as, for example, a rare earth aluminosilicate glass phase, an alkali aluminosilicate glass phase, an alkali earth aluminosilicate glass phase, a borosilicate glass phase, or the like.

First coating 92 may include a range of thicknesses. For example, the thickness of first coating 92 measured from a surface of protrusion 20 to substantially smooth surface 96 may be different than the thickness of first coating 92 measured a surface of depression 22 to substantially smooth surface 96. In some embodiments, the thickness of first coating 92 may range from approximately 0.001 inch (approximately 1 mil or 25.4 μm) to approximately 0.02 inch (approximately 20 mils or 508 μm). Of course, in some examples, the thickness of a portion substantially all of firs coating 92 may fall outside of this range. In some embodiments, the thickness of at least a portion of first coating 92 may range from approximately 0.002 inch (approximately 2 mils or 50.8 μm) to approximately 0.005 inch (approximately 5 mils or 127 μm).

Second coating 94 may comprise a TBC or an EBC. In embodiments in which second coating 94 comprises a TBC, the TBC may be selected from a variety of materials, including, for example, yttria-stabilized zirconia, yttria-stabilized hafnia, rare earth oxides, alumina, silica, rare earth silicates, titania, alkali metal oxides, alkali earth metal oxides, a rare earth oxide-stabilized zirconia, a rare earth oxide-stabilized hafnia, or combinations thereof.

In embodiments in which second coating 94 comprises an EBC, the EBC may provide at least one of water vapor stability, chemical stability, and environmental durability to a substrate 16 that includes, for example, a ceramic or CMC. The EBC may include, for example, a rare earth silicate, barium strontium alumina silicate ($BaO—SrO—Al_2O_3-2SiO_2$; BSAS), barium alumina silicate ($BaO—Al_2O_3-2SiO_2$; BAS), strontium alumina silicate ($SrO—Al_2O_3-2SiO_2$; SAS), calcium alumina silicate ($CaO—Al_2O_3-2SiO_2$; CAS), magnesium alumina silicate ($MgO—Al_2O_3-2SiO_2$; MAS) and lithium alumina silicate ($Li_2O—Al_2O_3-2SiO_2$; LAS); and the like.

Second coating 94 may comprise a thickness between approximately 0.001 inch (approximately 1 mil or 25.4 micrometers (μm)) and approximately 0.02 inch (approximately 20 mils or 508 μm). In some embodiments, second coating 94 may comprise a thickness between approximately 0.003 inch (approximately 3 mils or 76.2 μm) and 0.01 inch (approximately 10 mils or 254 μm).

Figure 8:
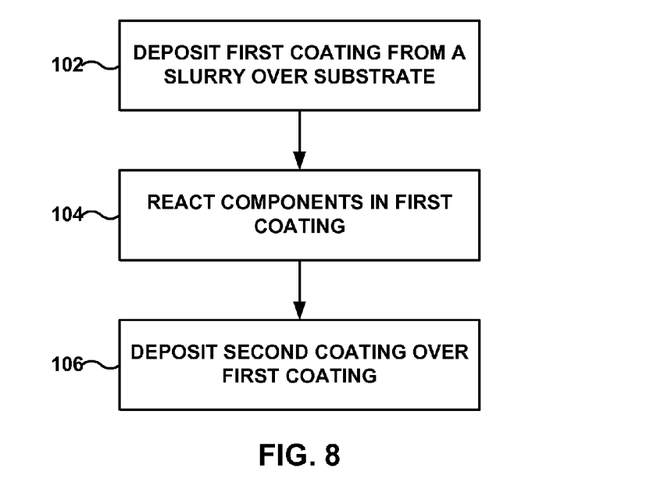
FIG. 8 is a flow diagram illustrating another exemplary technique for coating a substrate that defines a surface imperfection.

FIG. 8 is flow diagram of an exemplary technique for forming the coating of FIG. 7. Initially, first coating 92 is deposited from a slurry onto substrate 16 (102). The slurry from which first coating 92 is deposited may include a solvent, mullite, and at least one rare earth silicate, rare earth oxide, alumina, boron oxide, alkali metal oxide, alkali earth metal oxide, silicon, BSAS, BAS, SAS, CAS, MAS, or LAS. In some embodiments, the slurry may further include a binder, a dispersant, or both.

The mullite and the at least one rare earth oxide or rare earth silicate may be present in the slurry in relative amounts ranging from approximately 1 wt. % mullite and approximately 1 wt. % mullite, and a balance of at least one rare earth silicate, rare earth oxide, alumina, boron oxide, alkali metal oxide, alkali earth metal oxide, silicon, BSAS, BAS, SAS, CAS, MAS, or LAS. In a particular embodiment, a dry powder of the mullite and the at least rare earth silicate, rare earth oxide, alumina, boron oxide, alkali metal oxide, alkali earth metal oxide, silicon, BSAS, BAS, SAS, CAS, MAS, or LAS may include approximately 88 wt. % mullite and the balance at least one rare earth silicate.

The viscosity of the slurry may influence the formation of first coating 92. For example, a lower viscosity may result in a thinner first coating 92, while a higher viscosity may result in a thicker first coating 82. The viscosity of the slurry may be influenced by, for example, the particle size of the mullite, rare earth silicate, rare earth oxide, alumina, boron oxide, alkali metal oxide, alkali earth metal oxide, silicon, BSAS, BAS, SAS, CAS, MAS, or LAS in the slurry, the solvent viscosity, the percent solids (i.e., mullite, rare earth silicate, rare earth oxide, alumina, boron oxide, alkali metal oxide, alkali earth metal oxide, silicon, BSAS, BAS, SAS, CAS, MAS, or LAS) in the slurry, and the concentration of binder in the slurry.

The slurry may include particles of mullite and at least one rare earth silicate, rare earth oxide, alumina, boron oxide, alkali metal oxide, alkali earth metal oxide, silicon, BSAS, BAS, SAS, CAS, MAS, or LAS each having a narrowly distributed range of diameters or a more broadly distributed range of diameters. The diameters of the mullite and the at least one rare earth silicate, rare earth oxide, alumina, boron oxide, alkali metal oxide, alkali earth metal oxide, silicon, BSAS, BAS, SAS, CAS, MAS, or LAS may have a similar mean, median, distribution, or other characteristic measurement. Generally, the average diameter of the mullite and the at least one rare earth silicate, rare earth oxide, alumina, boron oxide, alkali metal oxide, alkali earth metal oxide, silicon, BSAS, BAS, SAS, CAS, MAS, or LAS particles may be on the order of tenths of a micrometer (approximately 0.000004 inch or 0.004 mils) to tens of micrometers (approximately 0.004 inch or 4 mils). The average diameters of the mullite particles and at least one rare earth silicate, rare earth oxide, alumina, boron oxide, alkali metal oxide, alkali earth metal oxide, silicon, BSAS, BAS, SAS, CAS, MAS, or LAS particles, respectively, may be similar or may be different. In some embodiments, the mullite particles may have an average diameter between approximately 0.1 µm (approximately 0.000004 inch or 0.004 mils) and approximately 10 µm (approximately 0.0004 inch or 0.4 mils). In other embodiments, the mullite particles may have an average diameter between approximately 1 µm and approximately 3 µm (approximately 0.00012 inch or 0.12 mils). The at least one of a rare earth silicate, rare earth oxide, alumina, boron oxide, alkali metal oxide, alkali earth metal oxide, silicon, BSAS, BAS, SAS, CAS, MAS, or LAS particles may have an average diameter of between approximately 0.1 µm (approximately 0.000004 inch or 0.004 mils) and approximately 10 µm (approximately 0.0004 inch or 0.4 mils). In some embodiments, the at least one of a rare earth silicate, rare earth oxide, alumina, boron oxide, alkali metal oxide, alkali earth metal oxide, silicon, BSAS, BAS, SAS, CAS, MAS, or LAS particles may have an average diameter of between approximately 0.6 µm (approximately 0.000024 inch or 0.024 mils) and approximately 1.5 µm (approximately 0.000059 inch or 0.059 mils). When all other factors are equal, a slurry including larger particles may have a higher viscosity than a slurry including smaller particles.

The slurry may include a range of percent solids in the solvent. For example, the slurry may include up to approximately 10 g solids per 1 g solvent. In some embodiments, the slurry may include between approximately 0.1 g solids per 1 g solvent and approximately 5 g solids per 1 g solvent. In particular embodiments, the slurry may include approximately 1 g solids per 1 g solvent, or may include approximately 1 g solids per 4 g solvent (0.25 g solids per 1 g solvent).

The solvent may include, for example, ethanol, isopropyl alcohol, water, or the like.

A dispersant may be included in the slurry to mitigate or substantially prevent agglomeration of the mullite, rare earth silicate, rare earth oxide, alumina, boron oxide, alkali metal oxide, alkali earth metal oxide, silicon, BSAS, BAS, SAS, CAS, MAS, or LAS particles in the slurry. In some embodiments, the dispersant may include polyvinyl butyral or phosphate ester.

The slurry may also include a binder. The binder may facilitate formation of a desirable second coating 12 by mitigating or substantially preventing cracks from forming in second coating 12 during drying. In some embodiments, the binder may include polyvinyl butyral.

The slurry may be deposited on substrate 16 by, for example, dip coating, spraying, painting, or the like. In some embodiments, substrate 16 may be submerged in the slurry and then removed relatively slowly from the slurry. For example, substrate 16 may be withdrawn from the slurry at a rate of approximately 0.1 millimeters/second (mm/s) to approximately 10 mm/s. In other examples, the substrate 16 may be withdrawn from the slurry at a rate of between approximately 3 mm/s and approximately 5 mm/s. The rate at which substrate 16 is withdrawn from the slurry may affect the thickness of first coating 92. For example, a slower withdrawal rate may result in a thicker coating, while a faster withdrawal rate may result in a thinner coating. In some embodiments, first coating 92 may be more likely to crack during post-dip sintering when coating 92 is thicker.

Article 90 then is dried to facilitate formation of first coating 92 and reaction of the mullite and the at least one rare earth silicate, rare earth oxide, alumina, boron oxide, alkali metal oxide, alkali earth metal oxide, silicon, BSAS, BAS, SAS, CAS, MAS, or LAS (104). For example, article 90 may be dried under a vacuum or in air at temperatures up to about 300° C. to remove substantially all of the solvent of the slurry and leave the mullite and the at least one rare earth silicate, rare earth oxide, alumina, boron oxide, alkali metal oxide, alkali earth metal oxide, silicon, BSAS, BAS, SAS, CAS, MAS, or LAS in first coating 92. After drying first coating 92, article 90 may be heat-treated at temperatures up to 1500° C. in a vacuum, an inert atmosphere such as Ar or He, a reducing atmosphere such as $H_2$, or air to facilitate sintering and chemical reaction of the mullite and the at least one rare earth silicate, rare earth oxide, alumina, boron oxide, alkali metal oxide, alkali earth metal oxide, silicon, BSAS, BAS, SAS, CAS, MAS, OR LAS. In some embodiments, the heat treatment may last as long as approximately 10 hours, i.e., up to approximately 10 hours. In some embodiments, the heat treatment may last as long as approximately 1 hr, i.e., up to approximately 1 hour. In some examples, the heat treatment may be performed in multiple steps with similar or different temperatures at each step.

Once the mullite and the at least one rare earth silicate, rare earth oxide, alumina, boron oxide, alkali metal oxide, alkali earth metal oxide, silicon, BSAS, BAS, SAS, CAS, MAS, or LAS have reacted, second coating 94 may be deposited over first coating 92 (106). Second coating 94 may be deposited by, for example, plasma spraying, physical vapor deposition, cathodic arc deposition, or chemical vapor deposition.

Figure 9:
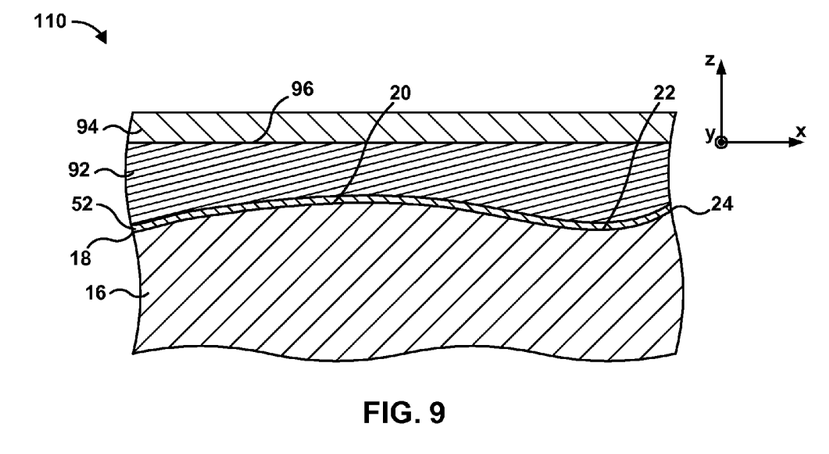
FIG. 9 is a cross-sectional diagram illustrating an exemplary article including a substrate defining a surface imperfection, a bond coat deposited over the substrate, a first coating that does not reproduce the surface imperfection deposited over the substrate, and a second coating deposited over the first coating.

In some embodiments, as illustrated in FIG. 9, first coating 92 may be deposited over or directly on a bond coat 52, which is deposited directly on substrate 16. In FIG. 9, first coating 92 is deposited directly on bond coat 52 and second coating 94 is deposited directly on first coating 14. In other embodiments, an article 90 may include additional layers between bond coat 52 and first coating 92, between first coating 92 and second coating 94, or both.

Bond coat 52 may be deposited over or deposited directly on substrate 16, and may substantially reproduce the contour of the surface of substrate 16, including any surface imperfections, e.g., protrusion 20 or depression 22. Bond coat 52 may improve adhesion between first coating 92 and substrate 16. In embodiments in which substrate 16 includes a superalloy, bond coat 52 may include an alloy, such as a MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-Ni$_3$Al nickel aluminide alloy (either unmodified or modified by Pt, Cr, Hf, Zr, Y, Si, and combinations thereof), or the like.

In other embodiments, bond coat 52 may include a ceramic or other material that is compatible with a substrate 16 that includes a ceramic or CMC. For example, bond coat 52 may include mullite (aluminum silicate, $Al_6Si_2O_{13}$), silica, silicides, silicon, or the like. Bond coat 52 may also include other ceramics, such as rare earth silicates, including silicates of Lu, Yb, Tm, Er, Ho, Dy, Gd, Tb, Eu, Sm, Pm, Nd, Pr, Ce, La, Y, Sc, or the like. Some preferred compositions of a bond coat 52 a substrate 16 including a CMC or ceramic include silicon, mullite, and ytterbium silicate.

Bond coat 52 may be selected based on a number of considerations, including the chemical composition and phase constitution of first coating 92 and substrate 16. For example, when substrate 16 includes a superalloy with a γ-Ni+γ'-Ni$_3$Al phase constitution, bond coat 52 may include a γ-Ni+γ'-Ni$_3$Al phase constitution to better match the coefficient of thermal expansion of substrate 16, and therefore increase the mechanical stability (adhesion) of bond coat 52 to substrate 16. Alternatively, when substrate 16 includes a CMC, bond coat 52 may include silicon and/or a ceramic, such as, for example, mullite or a rare earth silicate.

In some embodiments, bond coat 52 may include multiple layers. A bond coat 52 that includes multiple layers may be desirable because each layer may perform a separate function. For example, in some embodiments in which substrate 16 is a CMC including silicon carbide, a bond coat 52 including a first layer of silicon may be deposited on substrate 16, followed by the deposition of a second layer including mullite or a rare earth silicate. The silicon layer may provide bonding while the ceramic layer provides a gradual transition of thermal expansion and prevents water vapor from reaching the silicon layer.

In other embodiments, as described with respect to FIG. 7, an article may not include a bond coat 52. Bond coat 52 may not be required or desired when first coating 14 and substrate 16 are chemically and/or mechanically compatible. For example, in embodiments in which first coating 14 and substrate 16 adhere sufficiently strongly to each other, a bond coat 52 may not be necessary.

Article 110 further includes first coating 92, which is deposited from a slurry and does not substantially reproduce surface imperfections defined by the surface of substrate 16, e.g., protrusion 20 and/or depression 22. As described above, first coating 92 may include mullite and at least one rare earth silicate, rare earth oxide, alumina, boron oxide, alkali metal oxide, alkali earth metal oxide, silicon, BSAS, BAS, SAS, CAS, MAS, or LAS. First coating 92 defines a surface 96 opposite bond coat 52. In some embodiments, surface 96 may be substantially smooth or flat in at least one dimension over protrusion 20 and/or depression 22.

Article 110 also includes second coating 94 deposited over first coating 92. Second coating 94 may include a TBC or an EBC. In embodiments in which second coating 94 comprises a TBC, the TBC may be selected from a variety of materials, including, for example, yttria-stabilized zirconia, yttria-stabilized hafnia, rare earth oxides, alumina, silica, rare earth silicates, titania, alkali metal oxides, alkali earth metal oxides, a rare earth oxide-stabilized zirconia, a rare earth oxide-stabilized hafnia, or combinations thereof. In embodiments in which second coating 94 comprises an EBC, the EBC may include, for example, a rare earth silicate, BSAS, BAS, SAS, CAS, MAS, LAS, or the like.

Figure 10:
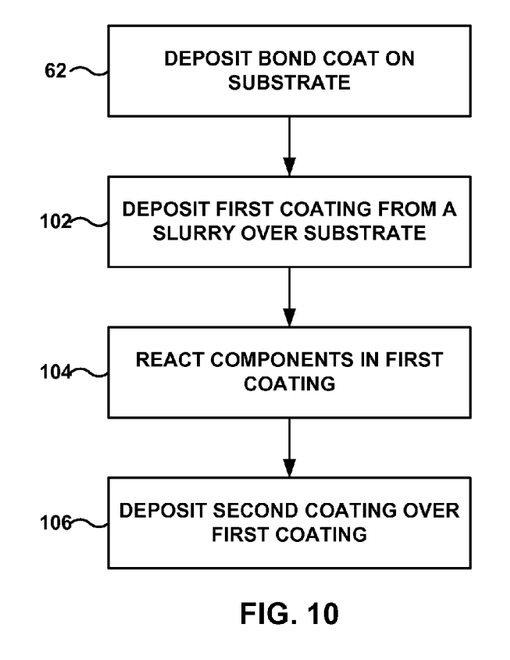
FIG. 10 is a flow diagram illustrating another exemplary technique for coating a substrate that defines a surface imperfection.

FIG. 10 is a flow diagram illustrating an exemplary technique for forming article 110. First, bond coat 52 is deposited on substrate 16 (62). Bond coat 52 may be deposited on substrate 16 via one of a number of methods, including, for example, chemical vapor deposition (CVD), physical vapor deposition (PVD), plasma spraying, cathodic arc deposition, sputtering, pack cementation, or the like. As illustrated in FIG. 9, bond coat 52 may substantially reproduce the contour of the surface of substrate 16, including any surface imperfections such as protrusion 20 or depression 22.

First coating 92 then is deposited on bond coat 52 (102). The slurry from which first coating 92 is deposited may include a solvent, mullite, and at least one rare earth silicate, rare earth oxide, alumina, boron oxide, alkali metal oxide, alkali earth metal oxide, silicon, BSAS, BAS, SAS, CAS, MAS, or LAS. In some embodiments, the slurry may further include a binder, a dispersant, or both. Further details regarding the slurry are described above with reference to FIGS. 2 and 8.

The slurry may be deposited on bond coat 52 by, for example, dip coating, spraying, painting, or the like. In some embodiments, substrate 16 and bond coat 52 may be submerged in the slurry and then removed relatively slowly from the slurry. For example, the substrate 16 may be withdrawn from the slurry at a rate of approximately 0.1 millimeters/second (mm/s) to approximately 10 mm/s. In other examples, substrate 16 may be withdrawn from the slurry at a rate of between approximately 3 mm/s and approximately 5 mm/s. The rate at which substrate 16 is withdrawn from the slurry may affect the thickness of first coating 92. For example, a slower withdrawal rate may result in a thicker first coating 92, while a faster withdrawal rate may result in a thinner first coating 92. In some embodiments, first coating 92 may be more likely to crack during post-dip sintering when coating 92 is thicker.

Article 110 then may be dried to facilitate formation of first coating 92 and reaction of the mullite and the at least one rare earth silicate, rare earth oxide, alumina, boron oxide, alkali metal oxide, alkali earth metal oxide, silicon, BSAS, BAS, SAS, CAS, MAS, or LAS (104). For example, article 110 may be dried under a vacuum or in air at temperatures up to approximately 300° C. to remove substantially all of the solvent of the slurry and leave the mullite and the at least one rare earth silicate, rare earth oxide, alumina, boron oxide, alkali metal oxide, alkali earth metal oxide, silicon, BSAS, BAS, SAS, CAS, MAS, or LAS in first coating 92. After drying first coating 92, article 90 may be heat-treated at temperatures up to 1500° C. in a vacuum, an inert atmosphere such as Ar or He, a reducing atmosphere such as H$_2$, or air to facilitate sintering and chemical reaction of the mullite and the at least one rare earth silicate, rare earth oxide, alumina, boron oxide, alkali metal oxide, alkali earth metal oxide, silicon, BSAS, BAS, SAS, CAS, MAS, OR LAS. In some embodiments, the heat treatment may last as long as approximately 10 hours, i.e., up to approximately 10 hours. In some embodiments, the heat treatment may last as long as approximately 1 hr, i.e., up to approximately 1 hour. In some examples, the heat treatment may be performed in multiple steps with similar or different temperatures at each step.

Once the mullite and the at least one rare earth silicate, rare earth oxide, alumina, boron oxide, alkali metal oxide, alkali earth metal oxide, silicon, BSAS, BAS, SAS, CAS, MAS, or LAS have reacted, second coating 94 may be deposited over first coating 92 (106). Second coating 94 may be deposited by, for example, plasma spraying, physical vapor deposition, cathodic arc deposition, or chemical vapor deposition.

Various embodiments have been described. These and other embodiments are within the scope of the following claims.

The invention claimed is:

1. A method comprising:
depositing a first coating over at least a portion of a substrate, wherein the substrate comprises at least one of a superalloy, a ceramic, or a ceramic matrix composite, wherein the substrate defines a surface imperfection, and wherein a surface of the first coating opposite the substrate substantially reproduces the surface imperfection;

depositing from a slurry a second coating over at least a portion of the surface of the first coating, wherein, upon deposition of the second coating, a surface of the second coating opposite the first coating does not substantially reproduce the surface imperfection, and wherein the second coating comprises mullite and at least one of a rare earth silicate, a rare earth oxide, boron oxide, an alkali metal oxide, an alkali earth metal oxide, barium strontium aluminosilicate, barium aluminosilicate, strontium aluminosilicate, calcium aluminosilicate, magnesium aluminosilicate, or lithium aluminosilicate; and reacting the mullite with the at least one of the rare earth silicate, the rare earth oxide, boron oxide, the alkali metal oxide, the alkali earth metal oxide, barium strontium aluminosilicate, barium aluminosilicate, strontium aluminosilicate, calcium aluminosilicate, magnesium aluminosilicate, or lithium aluminosilicate to form at least one of a rare earth aluminosilicate glass phase, an alkali aluminosilicate glass phase, an alkali earth aluminosilicate glass phase, or a borosilicate glass phase.

2. The method of claim 1, wherein the surface of the second coating defines a substantially flat surface over the surface imperfection.

3. The method of claim 1, wherein depositing the first coating over at least the portion of the substrate comprises plasma spraying the first coating over the substrate.

4. The method of claim 1, wherein depositing the first coating over at least the portion of the substrate comprises physical vapor deposition of the first coating over the substrate.

5. The method of claim 1, wherein depositing from the slurry the second coating over at least the portion of the first coating comprises dip-coating the second coating over at least the portion of the first coating.

6. The method of claim 1, wherein the surface imperfection comprises a depression.

7. The method of claim 1, wherein the surface imperfection comprises a protrusion.

8. The method of claim 1, further comprising depositing a bond coat over at least the portion of the substrate, wherein a surface of the bond coat opposite the substrate substantially reproduces the surface imperfection, and wherein depositing the first coating over at least the portion of the substrate comprises depositing the first coating over the bond coat.

9. The method of claim 1, wherein the at least one of the rare earth silicate, the rare earth oxide, boron oxide, the alkali metal oxide, the alkali earth metal oxide, barium strontium aluminosilicate, barium aluminosilicate, strontium aluminosilicate, calcium aluminosilicate, magnesium aluminosilicate, or lithium aluminosilicate comprises at least one oxide or silicate of La, Pr, Nd, Pm, Sm, Eu, Gd, Tb, Dy, Ho, Er, Tm, Yb, Lu, Y, or Sc.

10. The method of claim 1, wherein the first coating comprises at least one of a thermal barrier coating or an environmental barrier coating.

11. The method of claim 1, further comprising depositing a third coating over at least a portion of the second coating.

12. The method of claim 11, wherein depositing the third coating over at least the portion of the second coating comprises plasma spraying the third coating over at least the portion of the second coating.

13. The method of claim 11, wherein depositing the third coating over at least the portion of the second coating comprises physical vapor deposition of the third layer over at least the portion of the second layer.

14. A method comprising:
depositing from a slurry a first coating over at least a portion of a substrate that defines a surface imperfection, wherein the substrate comprises at least one of a superalloy, a ceramic, or a ceramic matrix composite, wherein, upon deposition of the first coating, a surface of the first coating opposite the substrate does not substantially reproduce the surface imperfection, and wherein the first coating comprises mullite and at least one of a rare earth silicate, a rare earth oxide, boron oxide, an alkali metal oxide, an alkali earth metal oxide, barium strontium aluminosilicate, barium aluminosilicate, strontium aluminosilicate, calcium aluminosilicate, magnesium aluminosilicate, or lithium aluminosilicate;

reacting the mullite with the at least one of the rare earth silicate, the rare earth oxide, boron oxide, the alkali metal oxide, the alkali earth metal oxide, barium strontium aluminosilicate, barium aluminosilicate, strontium aluminosilicate, calcium aluminosilicate, magnesium aluminosilicate, or lithium aluminosilicate to form at least one of a rare earth aluminosilicate glass phase, an alkali aluminosilicate glass phase, an alkali earth aluminosilicate glass phase, or a borosilicate glass phase; and depositing a second coating over at least a portion of the first coating.

15. The method of claim 14, wherein the surface of the first coating defines a substantially smooth surface over the surface imperfection.

16. The method of claim 14, wherein depositing the second coating over at least the portion of the first coating comprises plasma spraying the second coating over at least the portion of the first coating.

17. The method of claim 14, wherein depositing the second coating over at least the portion of the first coating comprises physical vapor deposition of the second coating over the first coating.

18. The method of claim 14, wherein depositing from the slurry the first coating over at least the portion of the substrate comprises dip coating the first coating over at least the portion of the substrate.

19. The method of claim 14, wherein the surface imperfection comprises a depression.

20. The method of claim 14, wherein the surface imperfection comprises a protrusion.

21. The method of claim 14, further comprising depositing a bond coat over at least the portion of the substrate, wherein a surface of the bond coat opposite the substrate substantially reproduces the surface imperfection, and wherein depositing from the slurry the first coating comprises depositing from the slurry the first coating over the bond coat.

22. The method of claim 14, wherein the at least of the one rare earth silicate, the rare earth oxide, boron oxide, the alkali metal oxide, the alkali earth metal oxide, barium strontium aluminosilicate, barium aluminosilicate, strontium aluminosilicate, calcium aluminosilicate, magnesium aluminosilicate, or lithium aluminosilicate comprises at least one oxide or silicate of La, Pr, Nd, Pm, Sm, Eu, Gd, Tb, Dy, Ho, Er, Tm, Yb, Lu, Y, or Sc.

23. The method of claim 14, wherein the second coating comprises at least one of a thermal barrier coating or an environmental barrier coating.

* * * * *

UNITED STATES PATENT AND TRADEMARK OFFICE
CERTIFICATE OF CORRECTION

PATENT NO. : 9,624,583 B2  
APPLICATION NO. : 12/750971  
DATED : April 18, 2017  
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this  
Twenty-fifth Day of September, 2018

Andrei Iancu  
*Director of the United States Patent and Trademark Office*